June 17, 1941.  C. F. JOHNSTON  2,245,980
PISTON RING
Filed Oct. 13, 1937
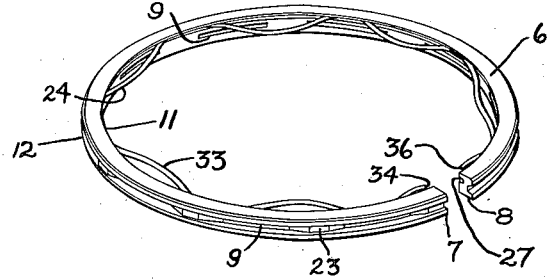
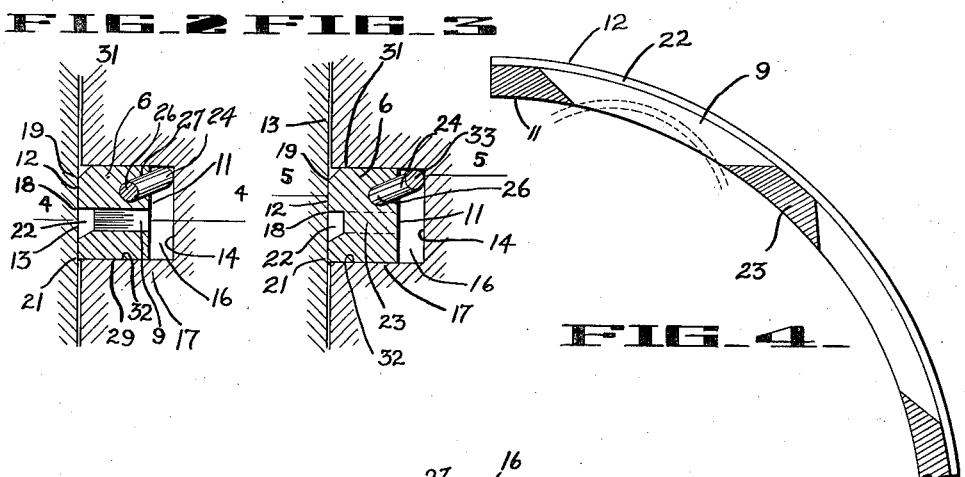
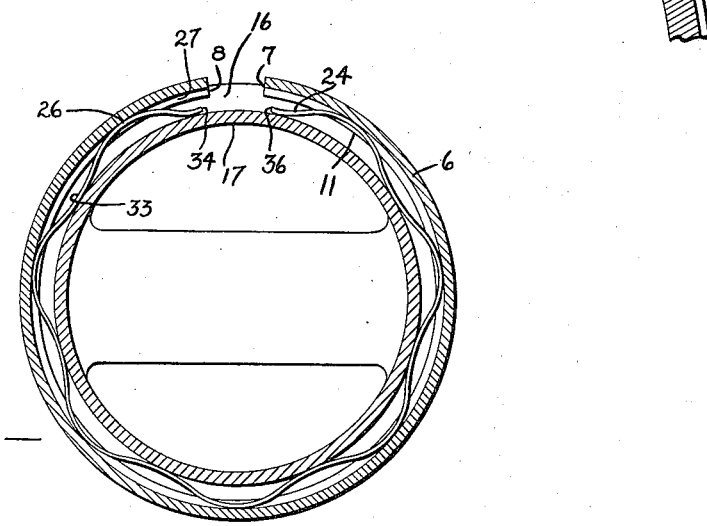
INVENTOR.
CHARLES F. JOHNSTON
BY Joseph B. Gardner
his ATTORNEY Patented June 17, 1941

2,245,980

UNITED STATES PATENT OFFICE 2,245,980

PISTON RING

Charles F. Johnston, Oakland, Calif.

Application October 13, 1937, Serial No. 168,748

6 Claims. (Cl. 309—43)

The invention relates to piston rings and more particularly to a ventilated or oil control type ring.

An object of the invention is to provide a ring of the character described which is provided with a circumferential oil groove having a peripheral edge adapted for scraping off and collecting excess oil from an engine cylinder and wherein such edge is so constructed and arranged as to be substantially unaffected by wear of ring so that the same will at all times remain in proper engagement with the cylinder wall and retain a sharp scraper edge.

Another object of the invention is to embody in a ring of the character described an auxiliary expander spring which will have its force applied along a line directed to the scraper edge of the ring groove so that the latter will be resiliently pressed against the cylinder wall.

A further object of the invention is to provide for the embodying of an expander spring in a ring of the character described without in any way interfering with or obstructing the free flow of oil through the oil slots or ports of the ring.

Still another object of the invention is to provide a ring of the character above which, notwithstanding the incorporation of an expander spring as set forth, will provide full radial ring sides at the longitudinal ends of the ring for engagement with the ring lands of the piston ring grooves.

Yet another object of the invention is to provide for the inclusion of an expander spring in a ring of the character described wherein the spring is designed and constructed and arranged within the ring in a manner causing an increase in the contacting wear area between the spring and the ring upon wearing of the ring so as to minimize the rate of wear of the spring and materially increase the productive life of the spring.

Another object of the invention is to incorporate a sinuous expander spring in a piston ring having a plurality of circumferentially spaced radially extending slots wherein the spring is so constructed and arranged relative to the ring as to prevent an extension of the spring through said slots and also to prevent the protrusion of the ends of the spring between and through the ends of the ring.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a perspective view of the piston ring constructed in accordance with the present invention.

Figure 2 is a radial sectional view of one part of the ring body and showing the same operatively mounted in a piston and cylinder.

Figure 3 is a view similar to Figure 2 but taken at a different part of the ring body.

Figure 4 is a transverse sectional view of part of the ring taken substantially on the plane of line 4—4 of Figure 2.

Figure 5 is a transverse sectional view of the piston and ring taken substantially on the plane of line 5—5 of Figure 3.

The piston ring of the present invention and as illustrated in the accompanying drawing is in its preferred form a so-called ventilated or oil control type ring which is provided with a plurality of circumferentially spaced radially extending oil slots or ports which extend radially through the body of the ring and communicate the outer peripheral side of the ring with the inner peripheral side for conducting oil scraped from the cylinder wall by the ring to the interior of the ring from where the oil may return to the crank case of the engine by way of suitable ports or openings through the base of the ring groove in the piston. The efficiency of this type of ring depends to a large extent upon the maintenance of a relatively sharp upper peripheral edge at the outer peripheral side of the ports for scraping excess oil from the cylinder wall and the maintaining of this edge in constant engagement with the cylinder wall. Heretofore, the position and arrangement of these slots in the ring body has been such, that upon wear of the ring the scraper edge of the groove is both dulled and withdrawn from immediate and direct contact with the cylinder wall. Usually the oil slots or ports are arranged through the body of the ring at substantially the longitudinal or axial center of the ring, so that the center plane of the slot at the outer side of the ring substantially coincides with the center radial plane of the ring. With such an arrangement the peripheral edges of the slots are removed and spaced from the center radial plane of the ring and due to a rocking of the piston about the outer peripheries of the ring and these edges are dulled and worn, so that after considerable use their efficiency as oil scraper edges is very substantially reduced. In accordance with the present arrangement I arrange the radial slots through the ring in such a manner that the center radial plane thereof is disposed below the center radial plane of the ring, with the result that the upper scraper edge of the slot is positioned substantially on the center radial plane of the ring. Thus the ring and piston will tend to rock about this upper scraper edge as a fulcrum and the principal wear on the ring will be to the opposite sides of this edge and the latter maintain sharp and always the furthest radially extended part of the ring, whereby engagement thereof with the cylinder wall is insured. Furthermore, I provide in the present ring a resilient means for urging the expansion of the ring and which has a principal direction of force passing substantially directly through the upper scraper edge of the ring slot. This resilient means, in accordance with the preferred form of the invention, consists of an auxiliary spring expander member which is mounted at the inner periphery of the ring for expanding the ring and has an axis of applied force which is inclined to the radial plane of the ring.

Another disadvantage in rings of the present character heretofore used has been that the mounting of an auxiliary spring expander member at the inner periphery of the ring has interfered with and partially obstructed the free flow of oil through the ring slots. In accordance with the present invention, this obstruction has been entirely eliminated by mounting the expander spring in an inside groove which is spaced axially from the ring slots so that the same at no time lies in the path of travel of the oil.

More specifically, the ring comprises an annular ring body 6 of conventional rectangular exterior form and may be composed of any suitable ring metal such as cast iron or various alloys. The ring is preferably formed of a single member of circular form with its free ends 7 and 8 in adjacent opposed relation. As indicated in the foregoing, there is provided through the body of the ring a plurality of circumferentially spaced radial slots 9 which extend from the inner periphery 11 to the outer periphery 12 of the ring for conducting oil removed from the cylinder wall 13 to the base or inner side 14 of a ring groove 16 provided in a piston 17 in which the ring is mounted. One of the important features of the present construction is that the slots 9 are contained substantially entirely in the lower half of the ring body, see Figures 2 and 3, so that the upper peripheral scraper edge 18 of the slots is disposed at substantially the center radial plane of the ring. In this manner, as above explained, the rocking of the ring about its outer peripheral side 12 during operation will produce greatest wear towards the upper and lower longitudinal ends 19 and 21 with the result that the peripheral edge 18 will become sharper with wear and will always constitute the furthest extended radial point of the ring and therefore will always be maintained in proper engagement with the cylinder wall. Preferably, an annular channel 22 is provided around the outer peripheral side 12 of the ring in alignment and registration with the slots 9, so that the upper scraper edge 18 of the ring will extend completely around the ring not only at the slot portions 9 but also at the intermediate solid portions 23 of the ring.

The expander means mentioned in the foregoing here comprises a sinuous wire spring member 24 of generally annular form and which engages at its outwardly curved portions 26 in an annular groove 27 formed in the inner peripheral side 11 of the ring. As an important feature of this arrangement the spring is of relatively small diameter and is supported substantially entirely above the central radial plane of the ring so that the same is at all times spaced from the inner ends of the slots 9 and may in nowise obstruct the free flow of oil through the slots. In accordance with this arrangement, the groove 27 is contained entirely in the upper solid portion of the ring above the slots 9 and preferably opens exclusively to the inner periphery 11 so as to not foreshorten the upper radial side 28 of the ring. Thus, notwithstanding the inclusion of both the expander spring and the oil slots in a ring of the character described, the full ring depth along the upper and lower radial sides 28 and 29 is not interfered with and a greatest possible area of contact is maintained between these radial sides of the ring and the upper and lower lands 31 and 32 of the piston.

As another important feature of the present construction, I so arrange the spring 24 in the ring and piston groove as to have a principal axis of applied force passing substantially directly through the scraper edge 18 so that this edge will be constantly urged against the cylinder wall. This is accomplished by forming the spring groove 27 along a transverse plane inclined to the plane of the ring, see Figures 2 and 3, and in substantial alignment with the edge 18 of the slots. The plane of the groove 17 is also such that the inner curved portions 33 will engage the base 14 of the ring groove at substantially the top land 31, so as to apply a downward and outward force on the ring.

Another advantage in the use of a circular wire expander in the manner described, is that while the initial contact of the outwardly and inwardly extending curved portions is confined to substantially a point on the periphery of the wire, any wear will cause a broadening of the point both diametrically with respect to the wire, and circumferentially with respect to the curved portion of the wire so that the greater the wear the greater the wearing surface, whereby the rate of wear is greatly minimized and the operative and useful life of the spring is materially lengthened. Also, preferably the free ends 34 and 36 of the spring are disposed at points radially inward from the outer curve portions 26 so that the same will tend to hug the base 14 of the piston ring groove and will in no instance become displaced between the free ends of the ring, either at the time of installation of the ring or during operation.

Another important feature of the present construction is the arranging of the undulated or sinuous portions of the spring of such a length and curvature relative to the length and radial width of the slots 9, as to positively prevent the extension of the wire expander through the slots; should the same ever become inadvertently displaced from its own supporting groove and aligned with the slots at the inner peripheral side of the ring. To provide such an arrangement the radial extension of the outwardly curved sinuous portions 26 of the spring for a length of the curve equivalent to the length of the slots, see Figure 4 is less than the radial width of the ring at the slots so that should such outwardly curved portions of the spring enter the inner side of the slots, the same could not extend to the outer side of the ring to engage the cylinder wall.

It will also be noted that due to the support of the ring, the undulated or sinuous portions of the spring can never be completely flattened out by compressing the ring in the piston groove and that, notwithstanding a full compression of the ring into the groove, the spring will retain a substantial sinuous form and maintain its resilience.

I claim:

1. A piston ring having an oil scraper edge extending around the outer peripheral side of said ring intermediate the longitudinal ends of said ring and substantially at the center plane of the ring, and a sinuous spring engaging the inner side of said ring and urging the expansion and applying an axis of force inclined to the radial plane of said ring and substantially passing through said scraper edge.

2. A piston ring provided with a radial slot defined between substantially parallel top and bottom walls disposed in radial planes and extending from the inner to the outer peripheries of the ring and having the outer top peripheral edge disposed on substantially the longitudinal center of the outer peripheral side of said ring, and a sinuous spring engaging the inner periphery of said ring above said top wall and applying an expanding force along a line substantially intersecting said top peripheral edge of said slot.

3. A piston ring provided with a plurality of circumferentially spaced radial slots extending between the outer and inner peripheral sides of the ring, and a sinuous expander spring member having a thickness less than the depth of said slots, the radial extension of said slots being greater than the radial extension of sinuous portions of said spring for the peripheral length of said slot to prevent the extension of said spring through said slots to the outer peripheral side of said ring.

4. A piston ring having a plurality of circumferentially spaced radial slots extending from the outer peripheral side of the ring to the inner peripheral side of the ring, an annular spring recess provided in the inner peripheral side of said ring spaced from said slots, and a sinuous spring mounted in said recess for urging the expansion of said ring and having the curvature of its sinuous portions such that the radial extension of such portions for the peripheral length of one of said slots is less than the radial width of said slots.

5. A piston ring having a plurality of circumferentially spaced radial slots each defined between substantially parallel top and bottom walls disposed in radial planes and extending from the outer periphery to the inner periphery of the ring and arranged with the top walls of said slots in a common plane at substantially the longitudinal center of the ring, thereby defining a greater ring area above said slots than below said slots, an annular spring recess formed in the inner peripheral side of said ring above said slots, and a sinuous spring mounted in said recess for urging the expansion of said ring and applying an expanding force along a line substantially intersecting the outer top peripheral edge of said slots.

6. A piston ring having a plurality of circumferentially spaced radial slots each defined between substantially parallel top and bottom walls disposed in radial planes and extending from the outer periphery to the inner periphery of the ring and arranged with the top walls of said slots in a common plane at substantially the longitudinal center of the ring, thereby defining a greater ring area above said slots than below said slots, an annular spring recess formed in the inner peripheral side of said ring above said slots, and a sinuous spring mounted in said recess for urging the expansion of said ring and applying an expanding force along a line substantially intersecting the outer top peripheral edge of said slots, said spring having the curvature of its sinuous portions such that the radial extension of such portions for the peripheral length of one of said slots is less than the radial width of said slots to prevent accidental extension of said spring through said slots to the outer peripheral side of said ring.

CHARLES F. JOHNSTON.